(12) United States Patent
Guo et al.

(10) Patent No.: US 10,901,427 B2
(45) Date of Patent: Jan. 26, 2021

(54) MEASUREMENT ASSEMBLY AND POSITIONING SYSTEM

(71) Applicant: BOE TECHNOLOGY GROUP CO., LTD., Beijing (CN)

(72) Inventors: Weiqing Guo, Beijing (CN); Hong Wang, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 333 days.

(21) Appl. No.: 15/925,819

(22) Filed: Mar. 20, 2018

(65) Prior Publication Data

US 2019/0033878 A1    Jan. 31, 2019

(30) Foreign Application Priority Data

Jul. 25, 2017    (CN) .......................... 2017 1 0612854

(51) Int. Cl.
| | | |
|---|---|---|
| *G05D 1/02* | (2020.01) | |
| *H05B 41/392* | (2006.01) | |
| *G01S 19/48* | (2010.01) | |
| *G01S 5/16* | (2006.01) | |

(52) U.S. Cl.
CPC .............. *G05D 1/0231* (2013.01); *G01S 5/16* (2013.01); *G01S 19/48* (2013.01); *H05B 41/3922* (2013.01); *H05B 41/3925* (2013.01)

(58) Field of Classification Search
CPC ......... G05D 1/0231; G01S 19/48; G01S 5/16; H05B 41/3922; H05B 41/3925

(Continued)

(56) References Cited

U.S. PATENT DOCUMENTS 4,825,260 A * 4/1989 Hendow .............. G01C 19/665
                                                           356/473
5,708,670 A * 1/1998 Pfeiffer ............... H01S 3/06791
                                                            372/18

(Continued)

FOREIGN PATENT DOCUMENTS

| CN | 202048915 U | 11/2011 |
|---|---|---|
| CN | 104020445 A | 9/2014 |

(Continued)

OTHER PUBLICATIONS

Foldover Effect in Spin-Wave Optoelectronic Active Ring Resonators; V. Vitko ; A. Nikitin ; A. B. Ustinov ; B. A. Kalinikos; IEEE Conference Paper (Year: 2018).*

(Continued)

*Primary Examiner* — Cuong H Nguyen

(74) *Attorney, Agent, or Firm* — Calfee, Halter & Griswold LLP

(57) ABSTRACT

A measurement assembly includes a first light emitter set including a plurality of light emitters arranged at equal intervals in a first direction, the light emitters emitting lights with frequencies different from one another; a light receiver disposed on an object under measurement and configured to receive incident lights from the light emitter set; and a position determination unit configured to determine a first current position of the object under measurement according to frequencies of incident lights currently received by the light receiver from the first light emitter set.

17 Claims, 4 Drawing Sheets

(58) Field of Classification Search
USPC .................. 701/23; 356/482, 484, 369–370
See application file for complete search history.

(56) References Cited

U.S. PATENT DOCUMENTS

| | | | | |
|---|---|---|---|---|
| 6,424,419 | B1* | 7/2002 | Tazartes | G01C 19/665 |
| | | | | 356/473 |
| 8,823,947 | B2* | 9/2014 | Heidrich | G01N 21/7746 |
| | | | | 356/480 |
| 9,702,700 | B2* | 7/2017 | Lefevre | G01C 19/727 |
| 2007/0252995 | A1* | 11/2007 | Shaw | G01N 21/552 |
| | | | | 356/437 |
| 2012/0182552 | A1* | 7/2012 | Heidrich | G01N 21/7746 |
| | | | | 356/364 |
| 2014/0071456 | A1* | 3/2014 | Podoleanu | G01B 9/02091 |
| | | | | 356/497 |
| 2015/0085297 | A1* | 3/2015 | Hughes | G01S 17/46 |
| | | | | 356/482 |
| 2019/0207678 | A1* | 7/2019 | Aoyama | H04B 10/1141 |

FOREIGN PATENT DOCUMENTS

| | | |
|---|---|---|
| CN | 106228828 A | 12/2016 |
| JP | H05240940 A | 9/1993 |
| JP | 2006170671 A | 6/2006 |

OTHER PUBLICATIONS

Digital performance of high-speed MSM-HEMT monolithically integrated photoreceivers; P. Fay ; W. Wohlmuth ; C. Caneau ; S. Chandrasekhar ; I. Adesida; Conference Proceedings. 1997 International Conference on Indium Phosphide and Related Materials; IEEE Conference Paper (Year 1997).*

Reduction of Backscattering Induced Noise by Carrier Suppression in Waveguide-Type Optical Ring Resonator Gyro ; Huilian Ma ; Zuyuan He ; Kazuo Hotate; Journal of Lightwave Technology; IEEE Journal Article, vol. 29 Issue 1 (Year 2011).*

First Office Action for Chinese Patent Application No. 201710612854.9 dated Mar. 14, 2019.

* cited by examiner

MEASUREMENT ASSEMBLY AND POSITIONING SYSTEM

CROSS REFERENCE TO RELATED APPLICATIONS

This application claims the benefit of China Patent Application No. 201710612854.9 and titled "MEASUREMENT ASSEMBLY AND POSITIONING SYSTEM" filed with the China Patent Office on Jul. 25, 2017, the entire content of which is hereby incorporated by reference.

TECHNICAL FIELD

The present disclosure relates to the field of optical measurement technology, and in particular, to a measurement assembly and a positioning system incorporating the measurement assembly.

BACKGROUND

With the advancement of science and technology, nowadays most of the common positioning technologies such as vehicle positioning technology utilize the satellite navigation and positioning system to implement positioning of for example the vehicle.

However, the positioning accuracy of the conventional satellite navigation and positioning system is undesirable at present, with the error usually being about 10 meters. In addition, the current satellite navigation and positioning system is generally limited to positioning of a single object. The function is monotonous, the operation is neither flexible nor convenient, and the application range is limited.

Therefore, there is a demand for a new technical solution to improve one or more problems existing in the above solution.

It should be noted that the information disclosed in the above background section is only for the enhancement of understanding of the background of the present disclosure and therefore can include other information that does not form the prior art that is already known to one of ordinary skill in the art.

SUMMARY

It is an object of the present disclosure to provide a measurement assembly and a positioning system incorporating the measurement assembly, which at least to some extent overcome one or more problems due to limitations and disadvantages of the related art.

Other features and advantages of the disclosure will be made apparent from the following detailed description, or may be learned by practice of the disclosure.

According to the first aspect of the embodiments of the present disclosure, there is provided a measurement assembly including:

a first light emitter set including a plurality of light emitters arranged at equal intervals in a first direction, the light emitters emitting lights of frequencies different from one another;

a light receiver disposed on an object under measurement and configured to receive incident lights from the light emitter set; and a position determination unit configured to determine a first current position of the object under measurement according to frequencies of incident lights currently received by the light receiver from the first light emitter set.

In an exemplary embodiment of the present disclosure, the measurement assembly includes a plurality of the first light emitter sets arranged at intervals in the first direction.

In an exemplary embodiment of the present disclosure, the emitted light from each of the light emitters is capable of forming a light ring at the light receiver; and the measurement assembly further includes:

a length determining module configured to determine a length of the object under measurement in the first direction according to a number of light rings formed in the light receiver at the same time.

In an exemplary embodiment of the present disclosure, the measurement assembly further includes:

a second light emitter set including a plurality of light emitters arranged at equal intervals in a second direction, the light emitters emitting lights of frequencies different from one another; wherein the first direction is perpendicular to the second direction; and the position determining unit configured to further determine a second current position of the object under measurement according to frequencies of the incident lights currently received by the light receiver from the second light emitter set.

In an exemplary embodiment of the present disclosure, the measurement assembly includes a plurality of the second light emitter sets at intervals in the second direction.

In an exemplary embodiment of the present disclosure, the light emitted by each of the light emitters includes light of a single frequency or light of multiple frequencies.

In an exemplary embodiment of the present disclosure, each of the light emitters includes a light source and a cone lens located in an optical path of light emitting from the light source.

In an exemplary embodiment of the present disclosure, each of the light emitters is disposed above a plane where the object under measurement is located.

In an exemplary embodiment of the present disclosure, each of the light emitters is disposed on a street lamp.

According to the second aspect of the embodiments of the present disclosure, there is provided a positioning system, including the measurement assembly according to any of the above embodiments.

In an exemplary embodiment of the present disclosure, the positioning system further includes:

a global positioning component configured to determine a position range of the object under measurement; and the position determining unit is further configured to position the object under measurement according to the position range and the first position.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
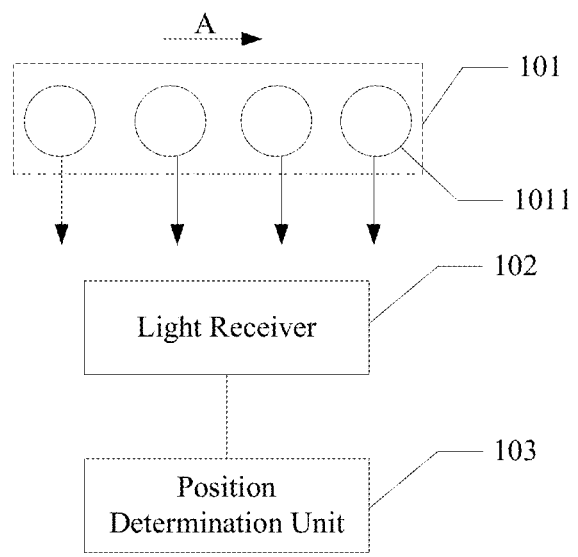
FIG. 1 schematically shows a schematic diagram of a measurement assembly in an exemplary embodiment of the present disclosure.

Exemplary embodiments will now be described more fully with reference to the accompanying drawings. However, the exemplary embodiments can be embodied in many forms and should not be construed as limited to the examples set forth herein; rather, these embodiments are provided so that this disclosure will be thorough and complete, and will fully convey the concepts of the exemplary embodiments to those skilled in the art. The features, structures, or characteristics described herein can be combined in any suitable manner in one or more embodiments.

In addition, the drawings are merely schematic representations of the present disclosure and are not necessarily drawn to scale. The same reference numerals in the drawings denote the same or similar parts, and a repetitive description thereof will be omitted. Some of the block diagrams shown in the figures are functional entities and do not necessarily correspond to physically or logically separate entities. These functional entities may be implemented in software form or implemented in one or more hardware or integrated circuits.

In this exemplary embodiment, a measurement assembly is provided first. Referring to FIG. 1, the measurement assembly may include a first light emitter set 101, a light receiver 102, and a position determination unit 103. The first light emitter set 101 may include a plurality of light emitters 1011 arranged at equal intervals in a first direction A, and the light emitters 1011 emit lights with frequencies different from one another. The light receiver 102 is disposed on an object under measurement and configured to receive incident lights from the light emitter set 101. The position determining unit 103 is configured to determine a first current position of the object under measurement according to frequencies of incident lights currently received by the light receiver 102 from the first light emitter set 101.

With the above measurement assembly, on one hand, the present disclosure provides a new positioning technology which can achieve a more accurate positioning of the object under measurement. On the other hand, the measurement assembly has a simple structure and low cost and can be applied to a variety of measurement scenarios, which is flexible and convenient and has a broad application prospect.

Hereinafter, various portions of the above-described measurement assembly in this exemplary embodiment will be described in more detail with reference to FIGS. 1 to 9.

Referring to FIG. 1, the first light emitter set 101 may include a plurality of light emitters 1011 arranged at equal intervals in a first direction A, and the light emitters 1011 emit lights with frequencies different from one another. For example, the first light emitter set 101 may be formed according to a group of a plurality of light emitters 1011 that emit lights of different colors, and the different colors correspond to different frequencies of the emitted lights. The different colors may be red, green, blue, etc., which are not limited herein. The plurality of light emitters 1011 in the first light emitter set 101 may be disposed at the side of a road, for example, at equal intervals along the road extending direction. The specific interval may be set according to the measurement requirement, which is not limited herein.

Figure 2:
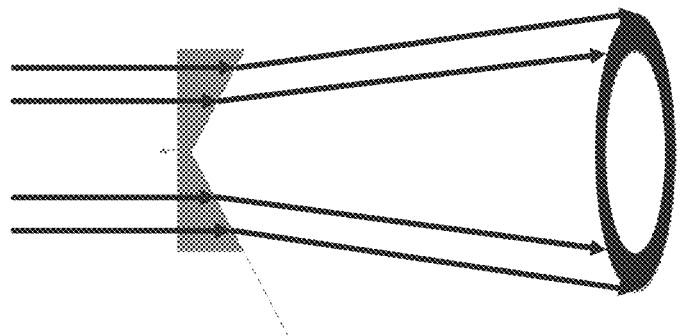
FIG. 2 schematically shows a schematic diagram of light refraction of a cone lens according to an exemplary embodiment of the present disclosure.
Figure 3:
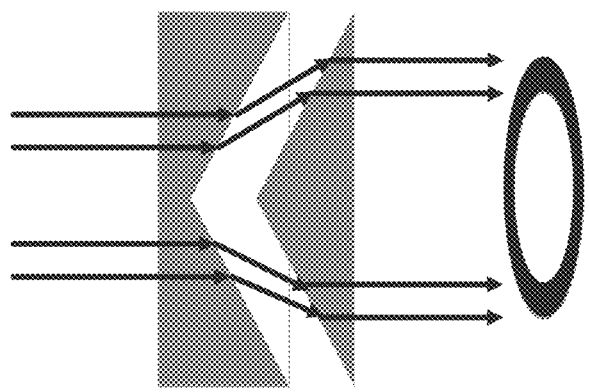
FIG. 3 schematically shows a schematic diagram of light refraction of another cone lens according to an exemplary embodiment of the present disclosure.
Figure 4:
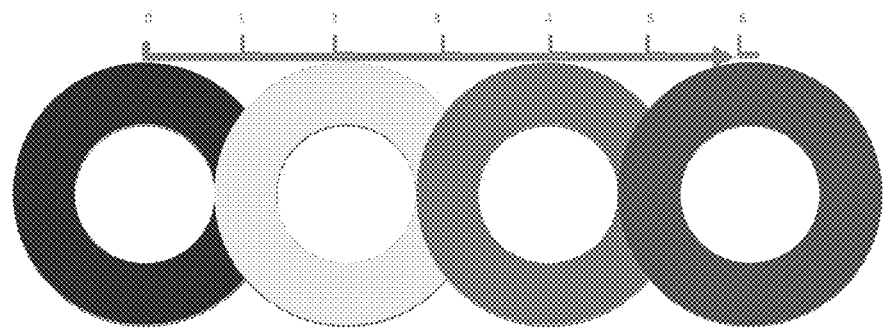
FIG. 4 schematically shows a schematic diagram of a light ring formed by a light emitter set in an exemplary embodiment of the present disclosure.
Figure 5:
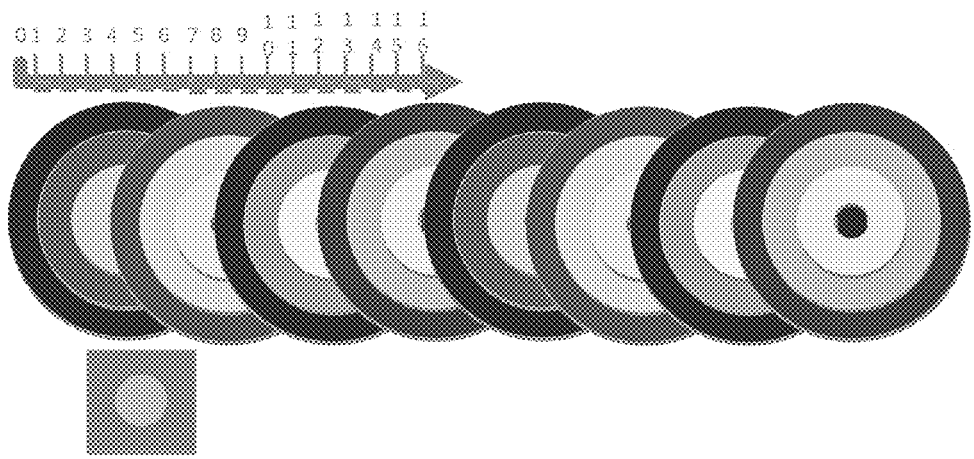
FIG. 5 schematically shows a process diagram of forming another light ring by a light emitter set in an exemplary embodiment of the present disclosure.

In an exemplary embodiment of the present disclosure, each of the light emitters 1011 may include a light source and a cone lens (not shown) located in an optical path of light emitted from the light source. Each light source in the first light emitter set 101 emits light of a different color. As shown in FIGS. 2-3, the cone lens, also commonly referred to as an axisymmetric prism, is a lens with a conical surface and a planar surface. Cone lenses are commonly used to generate Bessel intensity profile light beams or conical non-divergent light beams. Since the same kind of transmission medium has different refractive index to different lights, the lights beams emitted by the light sources and having several colors or frequencies pass through the cone lens and then form a phase diagram of concentric circles. Therefore, a distance between adjacent lights with different color is constant in any section which has the optical axis as the normal. Thus, it is possible to define in advance a light source (i.e. a light emitter) of a color as a zero point, and a light source (i.e. a light emitter) of another color as an end point. Then, the each light emitter in the first light emitter set has a position corresponding to a measurement point, as shown in FIGS. 4 and 5. This design may be applied to size measurement or positioning of an object under measurement in a plane.

Figure 6:
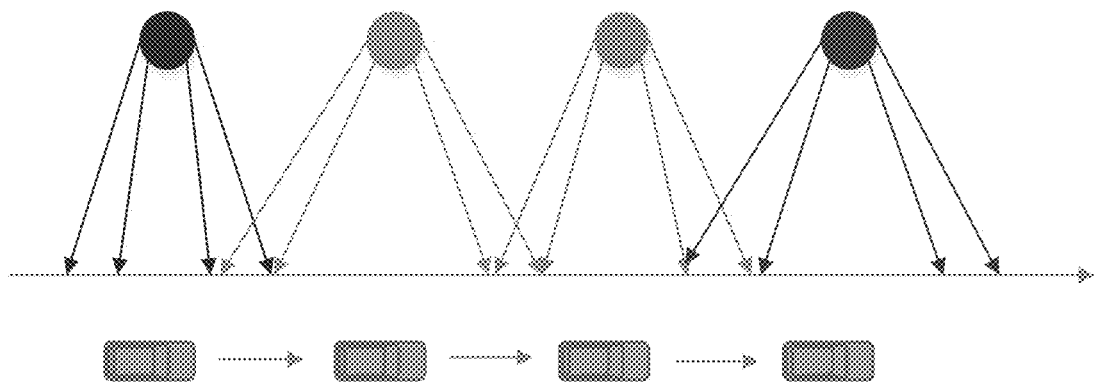
FIG. 6 schematically shows a schematic diagram of a measurement assembly for positioning a vehicle in an exemplary embodiment of the present disclosure.

Referring to FIG. 6, in a specific embodiment of the present disclosure, each of the light emitters 1011 may be disposed on a street lamp (not shown) along a road, and the lights emitted by the light sources may form a pattern of concentric circles (or referred to as light rings) on the road after passing through the cone lenses. The light ring irradiates on a vehicle shown in the bottom of FIG. 6, in order to facilitate positioning of the vehicle. To implement the deployment specifically, it is only has to install a cone lens on the street lamp, which is convenient and low in cost. The circles of different grayscale colors in FIG. 6 indicate light emitters that emit light of different colors, i.e., the light sources. The light receivers on the vehicle are not shown in FIG. 6.

The light receiver 102 is disposed on the object under measurement and is configured to receive incident lights from the light emitter set 101. For example, the object under measurement may be a vehicle driving on a road. The light receiver 102 may be disposed on the vehicle and receive incident lights from the light emitters 1011 in the light emitter set 101, which are disposed at equal intervals along the extending direction of the road. In an exemplary embodiment of the present disclosure, each of the light emitters 1011 is disposed above a plane where the object under measurement is located, for example, disposed on a street lamp roadside and above a vehicle, in view that lights emitted from above will not be obstructed and facilitate the positioning of the vehicle, as shown in FIG. 6. When the vehicle is driving, at a certain position, the vehicle will only receive a light signal of the same frequency (that is, a light of a single light frequency) or a light superimposed of lights of several frequencies. Since the light rings formed by the incident lights emitted by the light emitter set 101 are fixed, the light signal at each position is invariable. By disposing light emitters 1011 emitting lights of different frequencies at equal intervals on a roadside street lamp, the light emitters 1011 generate light signals of different frequencies, such that the corresponding light receiver 102 mounted in the vehicle may receive light signals of different frequencies.

The position determining unit 103 is configured to determine a first current position of the object under measurement according to frequencies of incident lights currently received by the light receiver 102 from the first light emitter set 101.

For example, the position determining unit 103 may be configured by a logic calculation unit such as a microprocessor, a microcontroller or other logic calculation device, etc. Since each light emitter 1011 in the first light emitter set 101 has a fixed position, such as absolute longitude and latitude coordinates, when the vehicle is driving at different positions on the road, the onboard light receiver 102 may receive lights of different frequencies, as shown in FIG. 6. The position determining unit 103 may determine the frequencies of the lights currently received by the light receiver 102, and then determine the current position of the vehicle. In this embodiment, very precise measurements can be made according to the type of the lights.

In an exemplary embodiment of the present disclosure, the measurement assembly may include a plurality of the light emitter sets 101 arranged at intervals in the first direction A. For example, additional light emitter sets 101 may be arranged along the extending direction of the road according to measurement requirement, so that the patterns of concentric circles formed on the road surface by the lights emitted by the light sources through the cone lenses may be in a head-to-tail form. Then, an infinite scale may be created, so as to facilitate positioning vehicles in a much longer range. Specifically, for example, a light emitter set 101 may be disposed at every preset distance of 10 m, for example, along the extending direction of the road. Thus, in a range of 10 m distance, there is one set of light emitters, in which frequencies of lights emitted by the light emitters are different from one another. That is, it suffices as long as that the light signals in adjacent regions are different to distinguish light waves of different frequencies.

The present disclosure not only can be used for positioning, but also for measuring, for example, the size of the object under measurement. In an exemplary embodiment of the present disclosure, in the first light emitter set 101, the emitted light from each of the light emitters 1011 may form a light ring at the light receiver 102. In an exemplary embodiment, the light emitted by each of the light emitters 1011 includes light of a single frequency or light of multiple frequencies. After passing through the cone lens, the single-frequency light may form a light ring of single color at the light receiver 102, as shown in FIG. 4, in which light rings of different grayscales represent light rings of different colors. After passing through the cone lens, the lights of multiple frequencies emitted from the same light source may form a circle light ring of multiple different colors at the light receiver, as shown in FIG. 5.

Figure 7:
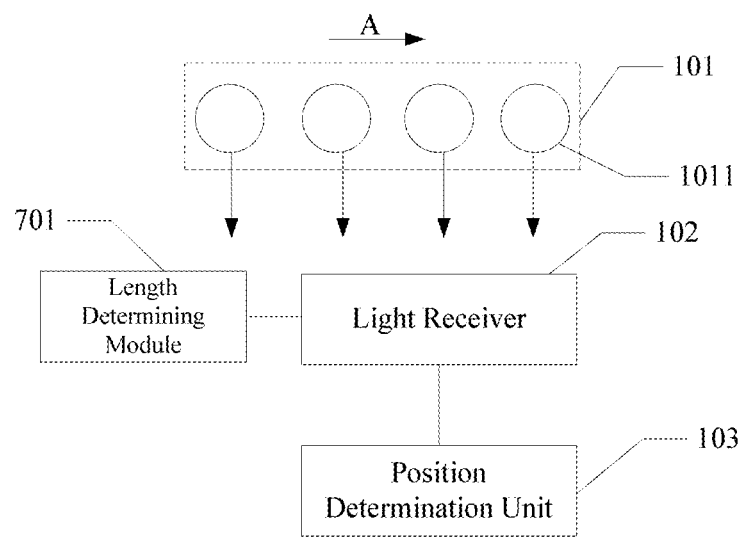
FIG. 7 schematically shows a schematic diagram of another measurement assembly in an exemplary embodiment of the present disclosure.

With continued reference to FIG. 7, the measurement assembly may further include a length determining module 701 configured to determine a length of the object under measurement in the first direction A according to a number of light rings formed in the light receiver 102 at the same time. For example, the length determining module 701 may determine the length of the vehicle driving on the road according to the number of the light rings formed in the light receiver 102 at the same time.

Figure 8:
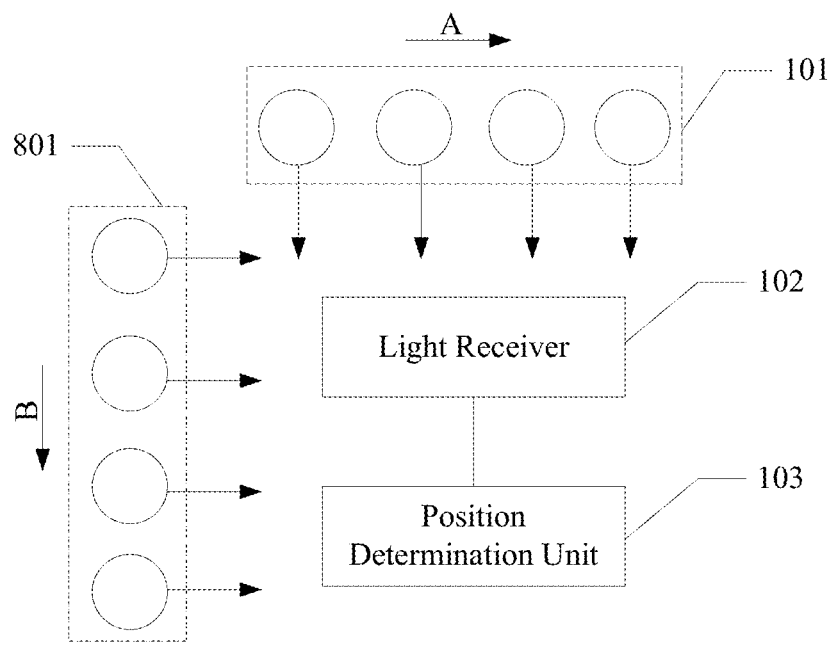
FIG. 8 schematically shows a schematic diagram of still another measurement assembly in an exemplary embodiment of the present disclosure.
Figure 9:
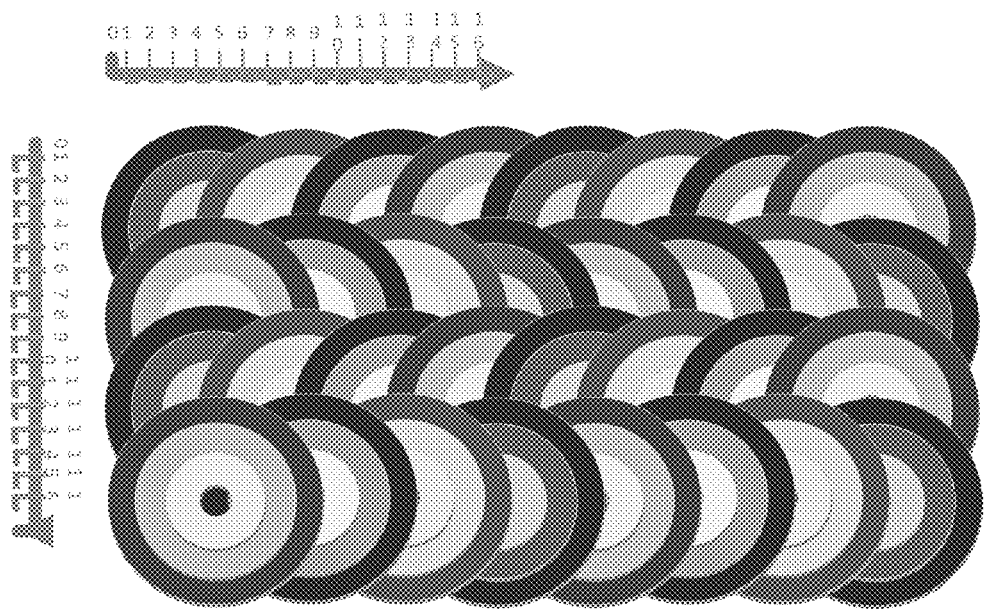
FIG. 9 schematically shows a two-dimensional measurement diagram of a measurement assembly in an exemplary embodiment of the present disclosure.

In addition, the present disclosure not only can be used for positioning, but also for accurately measuring the abscissa and ordinate of the object under measurement by deploying light emitter sets in two dimensions. Referring to FIGS. 8 to 9, in an exemplary embodiment of the present disclosure, the measurement assembly may further include a second light emitter set 801. The second light emitter set 801 may include a plurality of light emitters arranged at equal intervals in a second direction B, and the light emitters emit lights with frequencies different from one another. Further, in an exemplary embodiment, the measurement assembly may include a plurality of the second light emitter sets 801 (not shown in the Figures) arranged at intervals in the second direction B. The second direction B is perpendicular to the first direction A. For example, the first direction A may be a horizontal direction, and the second direction B may be a vertical direction. The second light emitter set 801 is the same as the first light emitter set 101, and may also form light rings, except that the arrangement directions are different. For the second light emitter set 801, reference may be made to the above specific description of the first emitter set 101, and details are not described herein again.

Correspondingly, the position determining unit 103 may be further configured to determine a second current position of the object under measurement according to frequencies of incident lights currently received by the light receiver 102 from the second light emitter set 801. For example, the position determining unit 103 may determine the second current position of the object under measurement in the second direction B and the first current position of the object under measurement in the first direction A at the same time, and thus may obtain the abscissa and the ordinate of the measured object, to realize the two-dimensional coordinate measurement. The embodiments of the present disclosure can expand the application range of the measurement assembly, and the measurement is flexible and convenient.

Further, a positioning system is also provided in this exemplary embodiment. The positioning system may include a measurement assembly. Specifically, as shown in FIG. 1, the measurement assembly may include a first light emitter set 101, a light receiver 102, and a position determining unit 103. The first light emitter set 101 includes a plurality of light emitters 1011 disposed at equal intervals in the first direction A, and the frequencies of the lights emitted by the light emitters 1011 are different from one another. The light receiver 102 is disposed at the object under measurement, and configured to receive incident lights from the light emitter set 101. The position determining unit 103 is configured to determine a first current position of the object under measurement according to frequencies of incident lights currently received by the light receiver 102 from the first light emitter set 101.

In an exemplary embodiment of the present disclosure, the measurement assembly may further include a plurality of the first light emitter sets 101 disposed at intervals in the first direction A. In an exemplary embodiment of the present disclosure, the light emitted from each of the light emitters 1011 may form a light ring at the light receiver 102. As shown in FIG. 7, the measurement assembly may also include a length determining module 701 configured to determine a length of the object under measurement in the first direction A according to a number of light rings formed in the light receiver 102 at the same time.

In an exemplary embodiment of the present disclosure, as shown in FIG. 8, the measurement assembly may further include a second light emitter set 801. The second light emitter set 801 may include a plurality of light emitters arranged at equal intervals in the second direction B, and the light emitters emit lights with frequencies different from one another. The second direction B is perpendicular to the first direction A. The position determining unit 103 may be further configured to determine a second current position of the object under measurement according to frequencies of incident lights currently received by the light receiver 102 from the second light emitter set 801.

In an exemplary embodiment of the present disclosure, the measurement assembly may include a plurality of the second light emitter sets 801 arranged at intervals in the second direction B. The light emitted by each of the light emitters 1011 includes light of a single frequency or light of multiple frequencies. Each of the light emitters 1011 may include a light source and a cone lens located in an optical path of light emitted from the light source. Each of the light emitters 1011 is disposed above a plane where the object under measurement is located, for example, disposed on a street lamp.

It should be noted that, with respect to the measurement assembly in the positioning system of the foregoing embodiments, the specific manners of the respective components have been described in detail in the embodiments related to the measurement assembly, which will not be elaborated herein.

Figure 10:
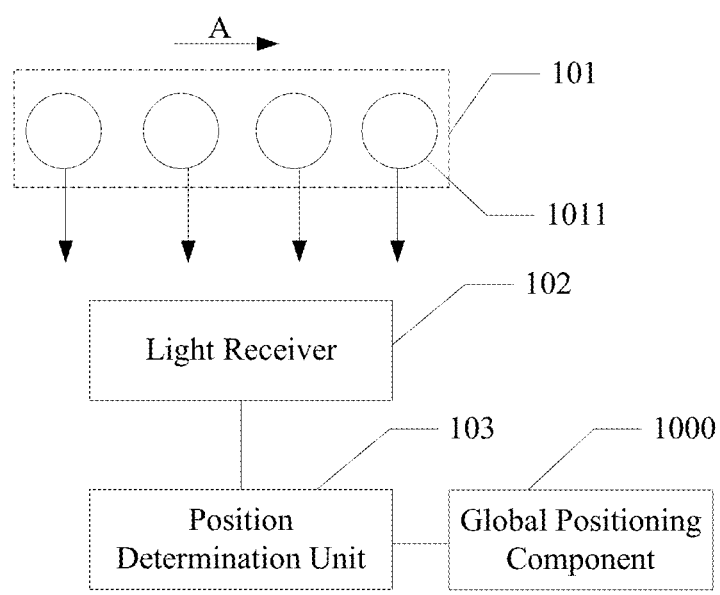
FIG. 10 schematically shows a schematic diagram of a positioning system in an exemplary embodiment of the present disclosure.

As shown in FIG. 10, the positioning system in the present disclosure may further include a global positioning component 1000 configured to determine a position range of the object under measurement. For example, the global positioning component 1000 may include, but is not limited to, a Global Positioning System (GPS) positioning module or the like. For example, when positioning a vehicle, an approximate range of the vehicle may be initially located according to a GPS positioning module, for example, within 10 meters.

The position determining unit 103 may be further configured to position the object under measurement according to the position range and the first position. For example, after being initially positioned by the GPS, according to defined positions corresponding to the lights of different frequencies emitted by a set of light emitters within the 10-meter region, the position determining unit 103 determines the specific position of the vehicle according to the frequencies of the lights currently received by the light receiver 102 on the vehicle. In this way, an approximate range is determined first by GPS, and then finer positioning is performed by the cooperation of the position determining unit 103, the light receiver 102 and the first light emitter set 101 or the second light emitter set 801, so that the positioning of the vehicle, for example, can be more accurate.

In the above-mentioned measurement assembly and the positioning system of the embodiments of the present disclosure, through the cooperation of the first light emitter set 101 and the light receiver 102 disposed on the object under measurement, together with the position determining unit 103, according to the frequencies of the lights currently received by the light receiver 102 from the first light emitter set 101, it can determine the current position of the object under measurement, such as a vehicle. On one hand, the present disclosure provides a new positioning technology which can achieve a more accurate positioning of the object under measurement. On the other hand, the measurement assembly has a simple structure and low cost and can be applied to a variety of measurement scenarios, which is flexible and convenient and has a broad application prospect.

It should be noted that although several modules or units of the device for action execution are mentioned in the detailed description above, this configuration is not mandatory. In fact, according to the embodiments of the present disclosure, the features and functions of two or more modules or units described above may be embodied in one module or unit. Conversely, the features and functions of one module or unit described above may be further divided into multiple modules or units. One of ordinary skill in the art can understand and implement without paying any creative effort.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. A measurement assembly comprising:
   a first light emitter set comprising a plurality of light emitters arranged at equal intervals in a first direction, the plurality of the light emitters emitting lights with frequencies different from one another, the light emitted by each of the plurality of the light emitters comprises light of a single frequency or light of multiple frequencies;
   a light receiver disposed on an object under measurement and configured to receive incident lights from the first light emitter set; and
   a position determination unit configured to, according to frequencies of incident lights currently received by the light receiver from the first light emitter set, determine which light emitter, of the plurality of light emitters in the first light emitter set, emitting the incident lights, and then determine a first current position of the object under measurement according to position of determined light emitter emitting the incident lights,
   wherein the emitted light from each of the plurality of light emitters is configured to form a light ring at the light receiver; and the measurement assembly further comprises:
   a length determining module configured to determine a length of the object under measurement in the first direction according to a number of light rings formed in the light receiver at the same time.

2. The measurement assembly according to claim 1, further comprising a plurality of the first light emitter sets arranged at intervals in the first direction.

3. A positioning system, comprising a measurement assembly, the measurement assembly comprising:
- a first light emitter set comprising a plurality of light emitters arranged at equal intervals in a first direction, the plurality of the light emitters emitting lights with frequencies different from one another, the light emitted by each of the plurality of the light emitters comprises light of a single frequency or light of multiple frequencies;
- a light receiver disposed on an object under measurement and configured to receive incident lights from the first light emitter set; and
- a position determination unit configured to, according to frequencies of incident lights currently received by the light receiver from the first light emitter set, determine which light emitter, of the plurality of light emitters in the first light emitter set, emitting the incident lights, and then determine a first current position of the object under measurement according to position of determined light emitter emitting the incident lights,
- wherein the emitted light from each of the plurality of light emitters is configured to form a light ring at the light receiver; and the measurement assembly further comprises:
- a length determining module configured to determine a length of the object under measurement in the first direction according to a number of light rings formed in the light receiver at the same time.

4. The measurement assembly according to claim 1, further comprising:
- a second light emitter set comprising a plurality of light emitters arranged at equal intervals in a second direction, the light emitters emitting lights with frequencies different from one another; wherein the first direction is perpendicular to the second direction; and
- the position determining unit further configured to determine a second current position of the object under measurement according to frequencies of the incident lights currently received by the light receiver from the second light emitter set.

5. The measurement assembly according to claim 2, further comprising:
- a second light emitter set comprising a plurality of light emitters arranged at equal intervals in a second direction, the light emitters emitting lights with frequencies different from one another; wherein the first direction is perpendicular to the second direction; and
- the position determining unit further configured to determine a second current position of the object under measurement according to frequencies of the incident lights currently received by the light receiver from the second light emitter set.

6. The measurement assembly according to claim 1, further comprising:
- a second light emitter set comprising a plurality of light emitters arranged at equal intervals in a second direction, the light emitters emitting lights with frequencies different from one another; wherein the first direction is perpendicular to the second direction; and
- the position determining unit configured to further determine a second current position of the object under measurement according to frequencies of the incident lights currently received by the light receiver from the second light emitter set.

7. The measurement assembly according to claim 1, further comprising a plurality of the second light emitter sets at intervals in the second direction.

8. The positioning system according to claim 3, wherein the positioning system further comprises:
- a global positioning component configured to determine a position range of the object under measurement; and
- the position determining unit is further configured to position the object under measurement according to the position range and the first position.

9. The measurement assembly according to claim 1, wherein each of the light emitters comprises a light source and a cone lens located on an optical path of light emitting from the light source.

10. The measurement assembly according to claim 2, wherein each of the light emitters comprises a light source and a cone lens located on an optical path of light emitting from the light source.

11. The measurement assembly according to claim 1, wherein each of the light emitters comprises a light source and a cone lens located in an optical path of light emitted from the light source.

12. The measurement assembly according to claim 4, wherein each of the light emitters comprises a light source and a cone lens located on an optical path of light emitted from the light source.

13. The measurement assembly according to claim 5, wherein each of the light emitters comprises a light source and a cone lens located on an optical path of light emitted from the light source.

14. The measurement assembly according to claim 9, wherein each of the light emitters is disposed above a plane where the object under measurement is located.

15. The measurement assembly according to claim 9, wherein each of the light emitters is disposed on a street lamp.

16. The positioning system according to claim 3, wherein the measurement assembly further comprises:
- a second light emitter set comprising a plurality of light emitters arranged at equal intervals in a second direction, the light emitters emitting lights with frequencies different from one another; wherein the first direction is perpendicular to the second direction; and
- the position determining unit further configured to determine a second current position of the object under measurement according to frequencies of the incident lights currently received by the light receiver from the second light emitter set.

17. The positioning system according to claim 16, wherein the measurement assembly comprises a plurality of the first light emitter sets arranged at intervals in the first direction.

* * * * *